United States Patent [19]

Li

[11] Patent Number: 5,058,132
[45] Date of Patent: Oct. 15, 1991

[54] CLOCK DISTRIBUTION SYSTEM AND TECHNIQUE

[75] Inventor: Gabriel M. Li, San Francisco, Calif.

[73] Assignee: National Semiconductor Corporation, Santa Clara, Calif.

[21] Appl. No.: 427,794

[22] Filed: Oct. 26, 1989

[51] Int. Cl.$^5$ .................. H04L 27/28; H04L 5/12
[52] U.S. Cl. ........................... 375/38; 375/107
[58] Field of Search .............. 375/38, 107, 111, 106; 370/85.5; 369/59

[56] References Cited

U.S. PATENT DOCUMENTS 4,646,324  2/1987  Albano et al. .................. 375/38

OTHER PUBLICATIONS

Floyd E. Ross, "FDDI-An Overview"; *Digest of Papers*, Computer Soc. Intl. Conf. Compcon '87, pp. 434–444.
FDDI Physical Layer Medium Dependent (PMD), Draft Proposal American National Standard, X3T9, 5/84–49, Rev. Jul. 1, 1988.
The Supernet Family for FDDI, Databook, Advanced Micro Devices, 1/1–6/17, 1989.

*Primary Examiner*—Benedict V. Safourek
*Assistant Examiner*—Tesfaldet Bocure
*Attorney, Agent, or Firm*—Limbach, Limbach & Sutton

[57] ABSTRACT

A clock distribution device (CDD) (100) is used in a concentrator (200,300) to distribute multiple bits of serial data (208) in parallel across back plane boards (Board A, B, N. NN) as a byte-wide data signal (214). Each back plane board (Board A, B, N, NN) has a CDD (100). One back plane board (Board A) has a master oscillator (120) which generates a local low frequency reference clock signal (212). The reference clock signal (212) is distributed to all of the back plane boards (Board A, B, N, NN) where each board's CDD (100) uses the reference clock signal (212) to generate a high frequency clock signal (TXCLK) and a plurality of local phase separated clock signals (LBC1-LBC5). Each board has a receiver (156a) and a transmitter (156b) and the low frequency clock signals (LBC1-LBC5) are employed to synchronize and de-skew the parallel data signal (214) transmitted across the back plane from board to board by using the local phase separated clock signals (LBC1-LBC5) generated on each board to strobe out the serial data (208) from the receiver (156a) in parallel as the parallel data signal (214), to latch in the parallel data signal (214) into a latch (LATCH) internal to the transmitter (156b), to enable a storage register (TXSR) on the transmitter (156b) which stores the parallel data signal (214) for conversion back to serial data, and to strobe in the parallel data signal (214) into a latch (170) when the CDD (100) is used in a large concentrator (300).

68 Claims, 10 Drawing Sheets

CLOCK DISTRIBUTION SYSTEM AND TECHNIQUE

TECHNICAL FIELD

The present invention broadly relates to a back plane distribution system and in particular, it relates to a system and technique for distributing a high frequency bit clock on individual boards for serial transmission of byte wide data across a back plane data bus.

BACKGROUND OF THE INVENTION

In a high speed communication system, data is often transmitted serially from a transmit station to receiving station through a medium (fiber, coax, etc.) where the receiving station converts the serial data into byte-wide data (for example 8 bits or 10 bits wide). The byte-wide data may be distributed at a back plane data bus to a host computer or to another station which reads in the byte wide data and shifts it out serially to a medium. The byte wide data is distributed at the back plane at a byte rate such that if the bit rate=x bits/s and a byte=y bits, then the byte rate=x/y bits/s.

The back plane data bus is employed to connect at least two back plane circuit boards together and therefore provides the means for point-to-point connection between the back plane boards. Typically, specific boards, such as AT, VME, etc. plug into their corresponding AT, VME, etc. back plane buses.

In a single board design, a high speed bit clock can be divided down to a byte clock. However, to distribute data across multiple back plane circuit boards, it is necessary to send (across the back plane) a high frequency bit clock and a strobe pulse along with the data. The back plan is capacitive in nature and hence, the higher the frequency of the bit clock, the more difficult it is to distribute the bit clock due to the increase in the jitter of the bit clock. In addition, the back plane data bus causes skew mismatch between the bit clock and the strobe pulse which results in adding or dropping bytes from the transmitted data. This invention addresses these issues and provides a clock distribution system and technique for use in a large protocol concentrator in a particular data transmission network: the Fiber Distributed Data Interface (FDDI) network.

The Fiber Distributed Data Interface (FDDI) protocol is an American National Standards Institute (ANSI) data transmission standard which applies to a 100 megabit/second token ring network that utilizes an optical fiber transmission medium. The FDDI protocol is described in "FDDI-an overview," *Digests of Papers IEEE Computer Society Int'l Conf., Compcon '87*, January, 1987, which is herein incorporated by reference. The FDDI protocol was intended as a high performance interconnection among mainframe computers as well as among mainframes and their associated mass storage sub-systems and other peripheral equipment.

The ANSI, *FFDI Physical Layer Medium Dependent*, Draft Rev. 9 (Mar. 1, 1989) which describes a multistation network is herein incorporated by reference. Information is transmitted on an FDDI ring in "frames" that consist of a sequence of 5-bit data characters or "symbols." Tokens are used to signify the right to transmit data between stations.

A Physical function (PHY) provides the hardware connection to adjacent stations; it provides the optical fiber hardware components that allow a link from one FDDI station to another. The physical function simultaneously receives and transmits serial data. The physical function's receiver receives the encoded serial data stream from a station through the medium establishes symbol boundaries based on the recognition of a start delimiter symbol pair, and transmits decoded symbols to its associates media access control function (MAC) (FIG. 1).

Referring to FIG. 1 an example of an FDDI data transmission network 10 is illustrated. In FDDI, a communication station 12 is connected optically, via fiber optic medium 14, 16 to a primary ring 14 and a secondary ring 16 which connects the station 12 to a concentrator station 200. The purpose of the secondary ring 16 is for redundancy. Each lettered box A-P, T-Z at a station 12 represents a back plane circuit board. (boards A, B, N in FIGS. 3 and 5). In the illustrated example, there are eleven stations 12, wherein each station 12 has at least one back plane board A-P, T-X. The boards B and W, W and Y, Y and U, U and T, C and T, B and C, O and M, L and M, L and O, J and S, K and S, J and K, F and I, G and F, G and I, D and E are connected together at the back plane by the back plane bus 20.

A receiving back plane circuit board on the primary ring, (for example board D at Station B receives serial data on the primary ring 14 from another board at another station, for example, from board C at Station 200) converts the serial data it receives from the other board at another station to byte wide data. In FDDI, the serial data rate is 125 MBits/s and the byte wide rate is 12.5 Mbyte/s. The data is transferred from one board (board D for example), to an adjacent board (for example to board E; then from board E to board F: from board F to board G; from board G to board H; from board H to board G; from board G to board I; and from board I to board J, etc.) until the transmitting board Board D receives its own data.

Each board A-P, T-X at each station 12 can optically connect at least one board on another station to it. Hence, all of the stations 12 can be logically connected to the primary FDDI ring 14 via a concentrator 200. In addition, a station 12, or board can be easily bypassed or a station 12 can be easily inserted into the FDDI network 10 via a concentrator 200 thereby eliminating the need for an expensive optical bypass switch.

A scheme that has been employed in the past to distribute byte-wide data across a back plane having a plurality of boards is the first-in-first-out (FIFO) scheme. Each back plane circuit board includes a byte wide FIFO memory or elasticity buffer and its own high frequency bit clock and divided down byte clock. The clock frequency skew between the boards is adjusted by each board's own on-board FIFO memory.

A transmitting station transmits the data and its byte clock to a receiving station which has its own bit and byte clock. The receiving station strobes the transmitted data into its elasticity buffer using the transmitting station's byte clock and, through the use of control circuitry, the data is retrieved by the receiving station's own byte clock for serial transmission. While the FIFO approach allows byte-wide data to be distributed across the back plane, it requires that each back plane board have a costly high frequency crystal oscillator, as well as FIFO memory, and control logic circuitry. Another disadvantage of the FIFO approach is that the FIFO memory delays the data transmission time from board to board.

SUMMARY OF THE INVENTION

The present invention provides a system for sequentially distributing multiple bits of data in parallel to a plurality of receivers which may be connected in a ring configuration. The system also includes means for receiving the multiple bits of data at a first receiver and for storing the serial data in a first storage means. The system employs a master clock signal, having a first frequency, where the master clock signal is transmitted to at least a first and a second of the receivers. The first and second receivers have a means for generating a second clock signal, having a second frequency, using the master clock signal. The first and second receivers also have means for generating a plurality of phase separated clock signals using the second frequency clock signal.

The serial data is transferred from the first storage means to the second receiver in parallel, using a first preselected one of the plurality of phase separated clock signals generated on the first receiver. The transferred parallel data is stored in parallel in a second storage means on the second receiver. The second storage means is enabled by a second preselected one of the plurality of phase separated clock signals generated on the second receiver.

The second storage means includes a first means for latching in the transferred parallel data using a first preselected one of the plurality of phase separated clock signals generated on the second receiver. The second preselected one of the phase separated clock signal generated on the second receiver has about the same phase and frequency as the first preselected one of the phase separated clock signal generated on the first receiver. The plurality of phase separated clock signals have about the same frequency as the frequency of the master clock signal.

The first preselected ones of the phase separated clock signals are selected such that the first preselected phase separated clock signal is separated from the second preselected ones of the phase separated clock signal by a preselected number of phases.

The second receiver provides means for reading out the parallel data stored in the second storage means in series using the second clock signal generated on the second receiver such that the stored data is read out of the second storage means in series within the cycle time associated with the first frequency.

The system may also have a total flight time associated with it, where the total flight time is the sum of the total clock flight time and the total data flight time, wherein the total clock flight time is the time it takes to transfer the master clock signal from the first receiver to the last receiver in the sequence of the plurality of the receivers and the total data flight time is the time it takes to transfer data in parallel from the last receiver in sequence back to the first receiver. Hence, the number of receivers in the system affects the total flight time. If the number of receivers in the system is such that the total flight time exceeds a preselected number, then the second receiver employs a second means for latching in the transferred parallel data received on the second receiver. The transferred parallel data is latched into the second means for latching, using a second preselected one of the plurality of phase separated clock signals generated on the second receiver, and it is latched out of the second means for latching using the first preselected one of the plurality of phase separated clock signals generated on the second receiver for input to the means for storing. The second preselected one of the plurality of phase separated clock signals is selected to generate sufficient set up and hold times for the second means for latching and sufficient setup and hold times for the first means for latching.

It is therefore a primary object of the present invention to provide a single integrated device for synchronizing a byte clock for back plane data distribution.

Another object of the present invention is to provide a scheme for high speed bit clock generation for serial transmission of byte wide data.

A further object of the present invention to provide a scheme employing a single master byte clock from which boards are synchronized to.

It is also a object of the present invention is to generate a high frequency bit clock from a master byte clock distributed on the back plane to individual back plane boards.

Another object of the present invention is to provide a means to cancel both the clock and data flight time delays when data returns to the board where it was originally distributed.

These, and further objects of the invention will be made clear or will become apparent during the course of the following description of a preferred embodiment of the present invention.

DESCRIPTION OF THE PREFERRED EMBODIMENTS

Figure 1:
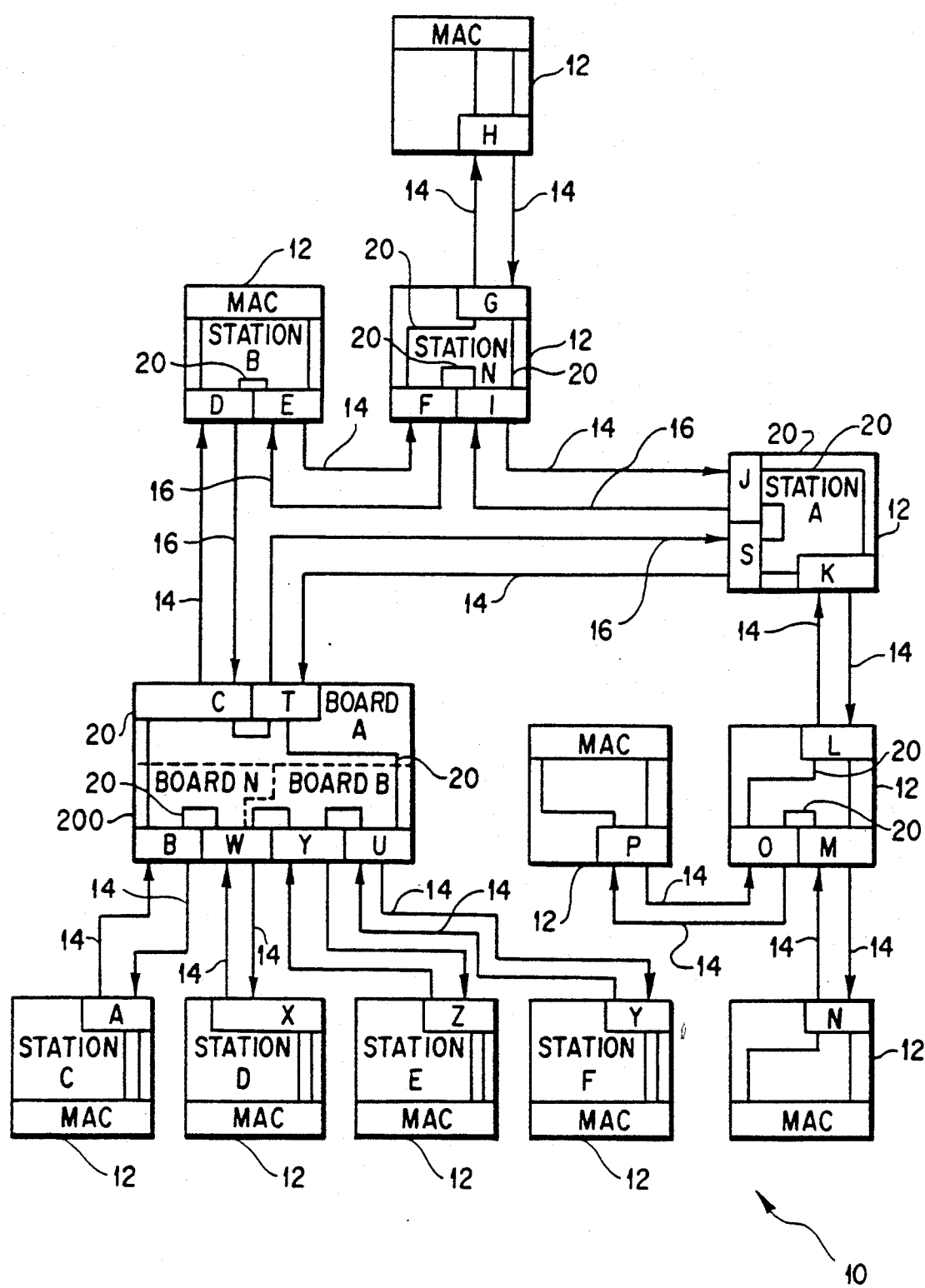
FIG. 1 is a diagram of an example of an FDDI topology.
Figure 2:
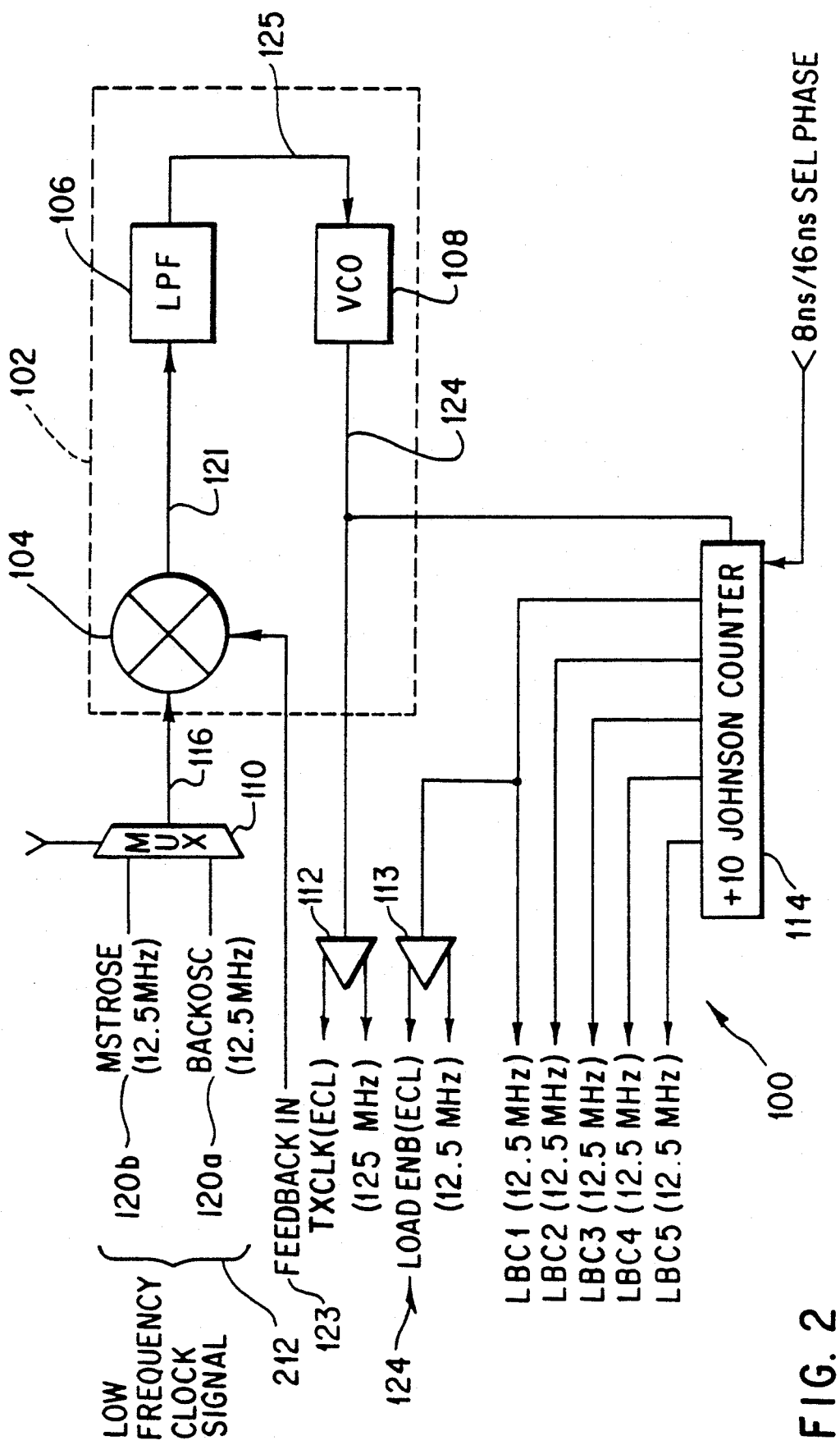
FIG. 2 is a block diagram of a clock distribution device scheme in accordance with the present invention.

Referring to FIG. 2, a block diagram of a clock distribution device 100 (CDD) is illustrated. The CDD 100 may be used in a single communication station or it may be used in a concentrator. A concentrator (200 in FIG. 1) is used to connect several communications stations (12 in FIG. 1) in a network (network 10 in FIG. 1) such that multiple bits of data may be sequentially distributed in parallel to a plurality of receivers connected in a ring configuration. An example of a ring configuration is the FDDI token ring configuration described above.

A user selectable reference clock signal 212 generated by a local oscillator 120 (FIG. 3) and the clock signal 212 is either a master clock signal MSTROSC 120b, or a back plane clock signal BACKOSC 120a.

Figure 3A:
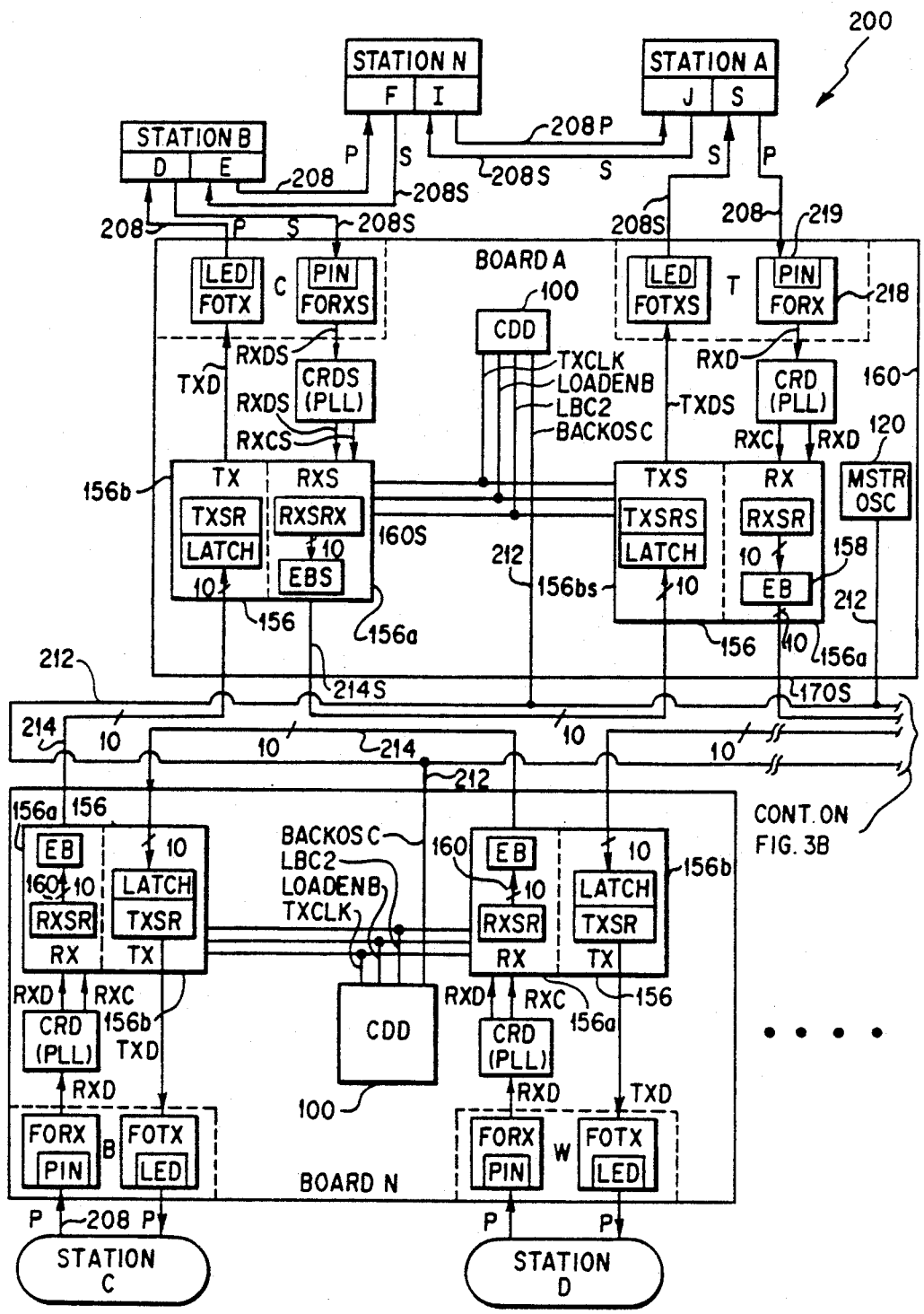
FIG. 3 is a block diagram of a clock distribution device employed in a small concentrator scheme.
Figure 3:
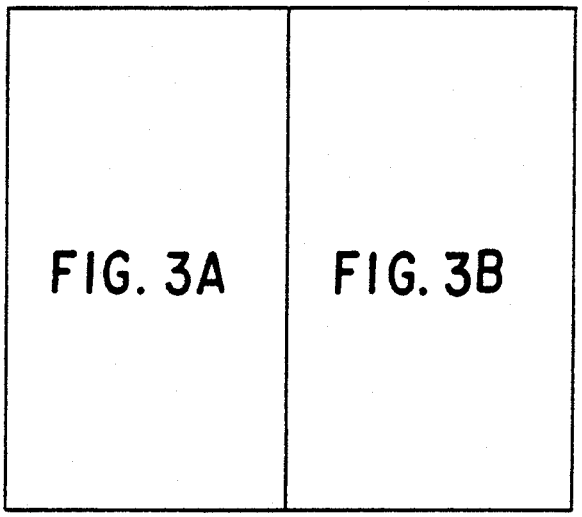
Figure 3B:
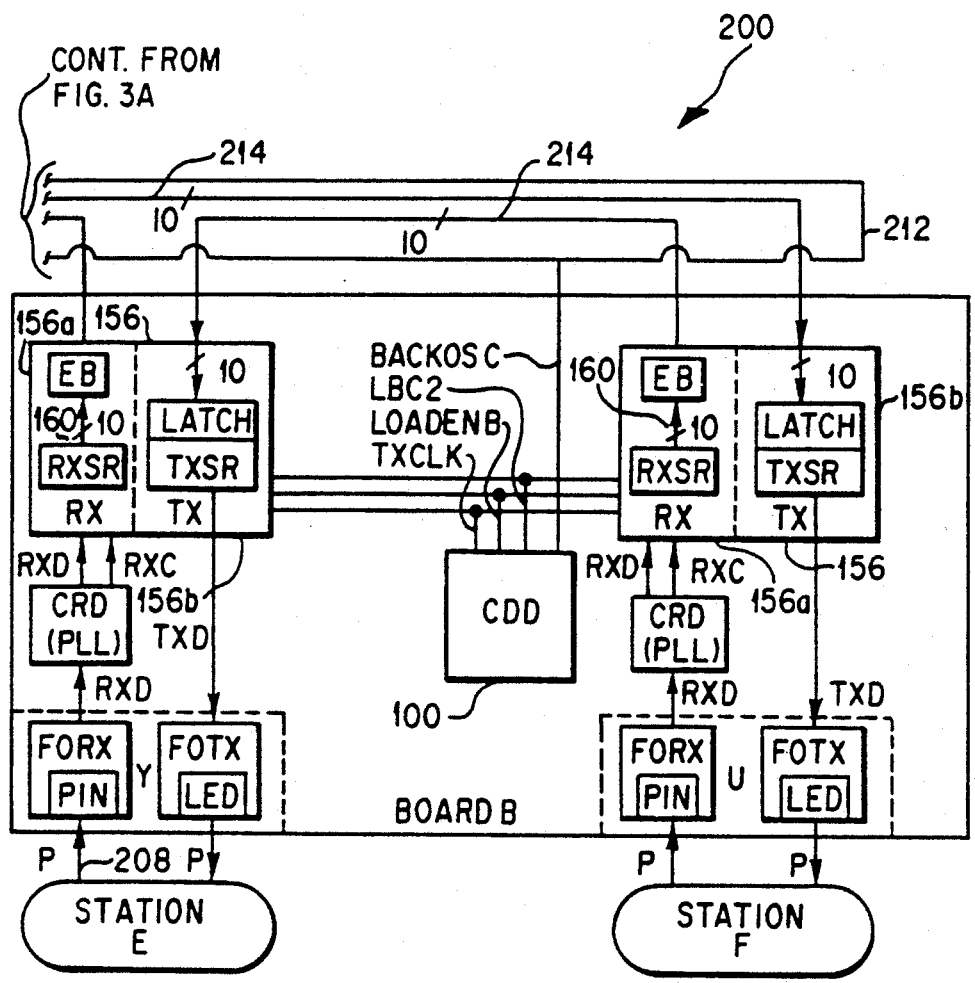

The clock signal 120a, 120b selected is selected via a multiplexer (MUX) 110. In the preferred embodiment, the reference clock signal 212 is a low frequency clock signal. In particular it 212 is a 12.5 MHz signal which is produced by a master 12.5 MHz crystal oscillator 120 (FIG. 3). Hence, the MSTROSC signal 120b and BACKOSC 120a signal have the same frequency. The clock signal 120a or 120b that is selected is selected based upon whether the CDD 100 is being used in a single station or in a concentrator, (200 in FIG. 1). (If the CDD 100 is used as a single station, the MSTROSC 120b signal is selected; if the CDD 100 is used as a concentrator the BACKOSC 120a signal is selected.)

The selected reference clock signal 116 is input into a phase locked loop (PLL) 102 which includes a phase comparator 104 whose error signal 127 is fed to a low pass filter (LPF) 106 which controls a voltage controlled oscillator 108 (VCO). In the preferred embodiment, the VCO 108 is a 125 MHz oscillator which generates a 125 MHz clock signal 124 (TXCLK). The VCO 108 can also be any multiple of 125 MHz and scaled down to generate the 125 MHz clock signal 124.

The selected clock signal 116 is input into the phase comparator 104 which compares the phase and frequency of the selected clock signal 116 with the phase and frequency of a feedback signal 123 where the feedback signal 123 is one of a plurality of selectable low frequency local byte clock signals LBC1-LBC5 the local byte clock signal selected is selected by an external jumper (not illustrated).

The phase comparator 104 generates an error signal 127 indicative of the difference in phase between the feedback signal 123 and the selected clock signal 116. The error signal 127 is filtered by the low pass filter 106 and the filtered error signal 125 is input to the VCO 108. The filtered error signal 125 is used to increase or decrease the VCO 108 so that the VCO 108 locks in phase with the selected clock signal 116. When the VCO 108 is substantially in phase with the selected clock signal 116, the error signal 127 is about zero.

The VCO 108 generates a high frequency clock signal 124 (TXCLK) which, in the preferred embodiment, is a 125 MHz clock signal. Hence, the high frequency clock signal 124 is generated from a low frequency clock signal 116 which is input into the phase locked loop 102. The high frequency clock signal 124 is designated as a transmit clock signal (TXCLK) and is converted to an ECL signal, by an ECL buffer 112, such that the signal TXCLK has differential outputs.

The transmit clock signal 124 is also input into a Johnson counter 114. The Johnson counter 114, divides the high frequency clock signal 124 into a plurality of lower frequency local byte clock signals LBC1-LBC5. In the preferred embodiment, the Johnson counter 114 is a divide by ten, five bit shift register, and divides the high frequency clock signal 124 into five low frequency local byte clock signals LBC1-LBC5. Since the high frequency signal 124 has a frequency of 125 MHz, the Johnson counter 114 outputs five local byte clock (LBC) signals LBC1-LBC5 each having a frequency of 12.5 MHz. A selectable phase (SEL PHASE) of 8 or 16 ns., in the preferred embodiment, is also input into the Johnson counter 114 such that the local byte clock signals LBC1-LBC5 generated are separated in phase.

The phase locked loop 102 is closed externally by connecting the feedback signal 123 to one of the local byte clock signals (LBC1-LBC5). In the preferred embodiment, the LBC1 signal is selected as the signal which connects to the feedback signal 123 in order to close the loop.

Since the first signal LBC1 out of the Johnson counter 114 is not phase delayed, the phase of the first signal LBC1 and the low frequency reference clock signal 212 are about the same. Any phase difference between them is negligible.

A load enable signal (LOADENB) and the first local byte clock signal LBC1 are generated from the same source. The LBC1 signal is a TTL signal while the LOADENB signal is a differential ECL signal. ECL buffer 113 converts the LOADENB signal to a differential 100K compatible output.

Figure 6A:
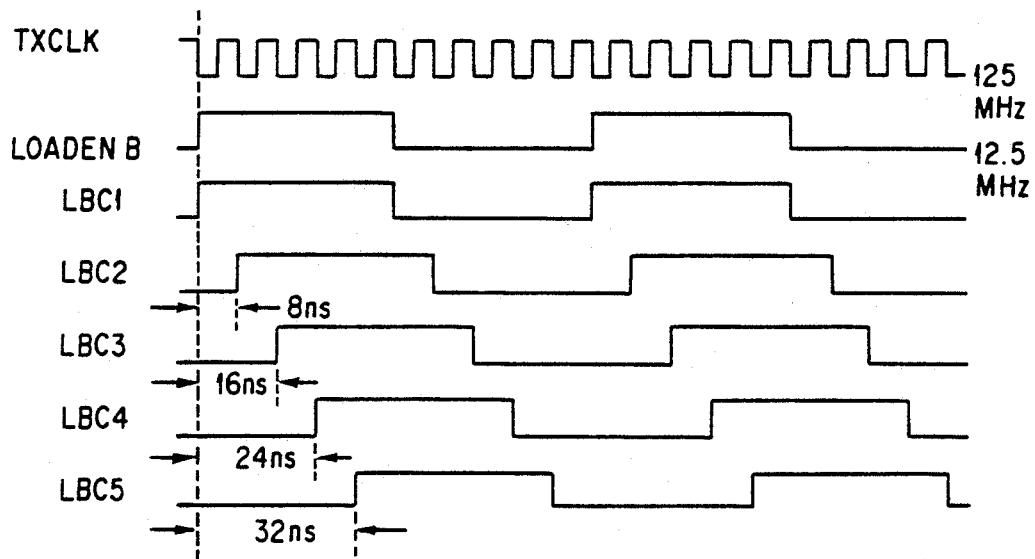
FIG. 6a is a timing diagram which illustrates the phase relationship between the local byte clock signals for the block distribution device in FIG. 2.
Figure 6B:
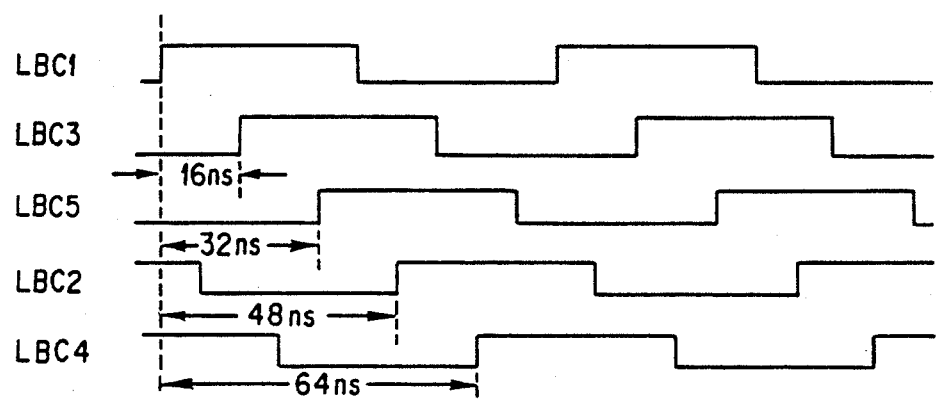
FIG. 6b is an alternate timing diagram which illustrates the phase relationship between the local byte clock signals for the clock distribution device of FIG. 2.

Referring also to FIGS. 6a and 6b, for the clock distribution device 100 of FIG. 2 the phase relationship between the local byte clock signals LBC1-LBC5 when a low phase is selected (8 ns., for example) is illustrated in FIG. 6a and when a high phase is selected (16 ns., for example) is illustrated in FIG. 6b. Referring in particular to FIG. 6a, if the desired phase separation between the local byte clock signals LBC1-LBC5 is 8 ns., then SEL PHASE is not enabled and remains in a logic low state. The LBC1-LBC5 clock signals are phase separated by 8 ns. such that the LBC5 signal and the LBC1 signal are 32 ns. apart in phase.

Referring in particular to FIG. 6b, to phase separate the local byte clock signals LBC1-LBC5 by 16 ns., SEL PHASE is selected. Asserting SEL PHASE alternately inverts the clock signals. Hence, in the preferred embodiment, the LBC2 and LBC4 signals are inverted such that the signals generated by the Johnson counter 114 are each 16 ns. apart.

Figure 5A:
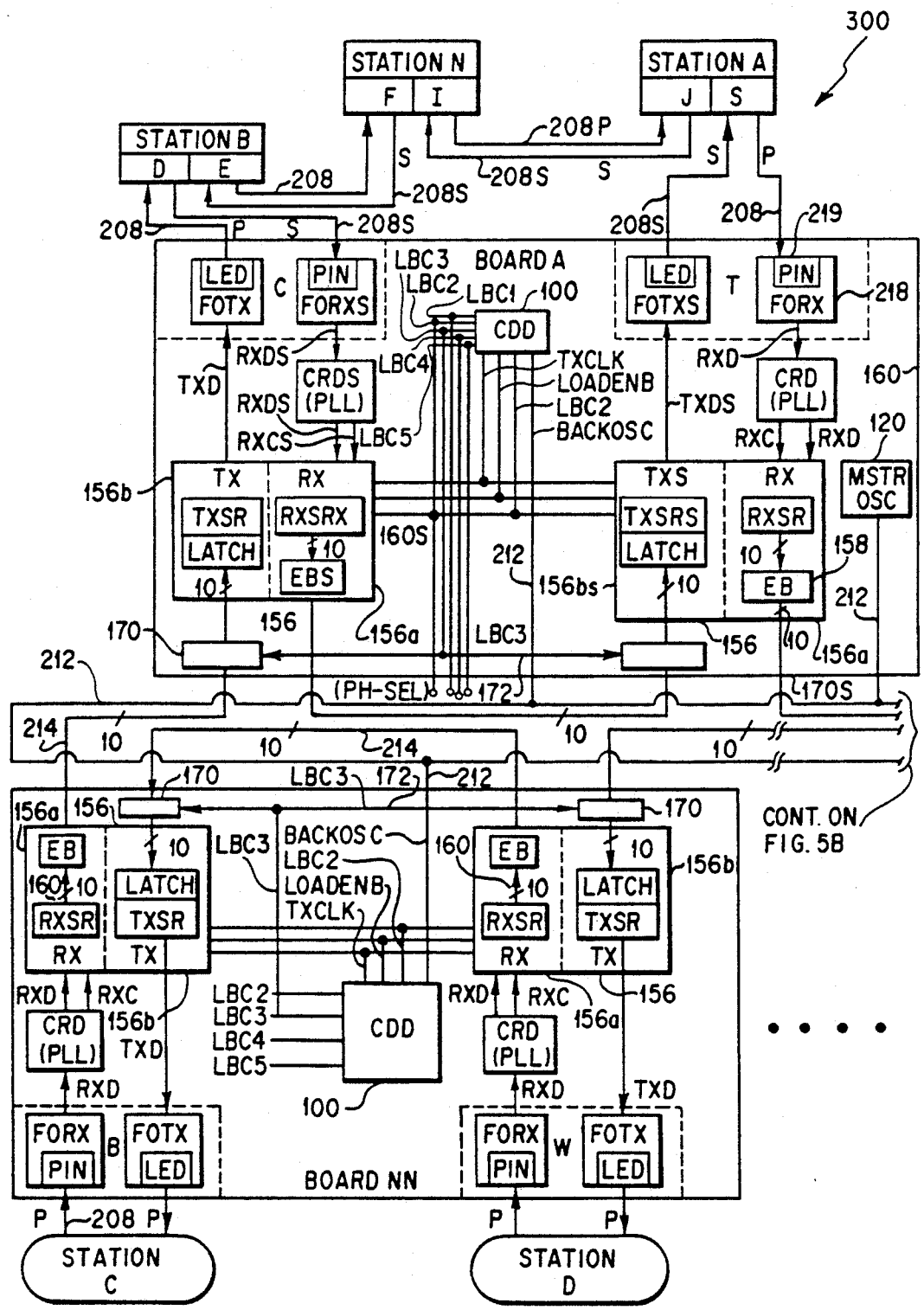
FIG. 5 is a block diagram of a clock distribution device employed in a large concentrator scheme.
Figure 5:
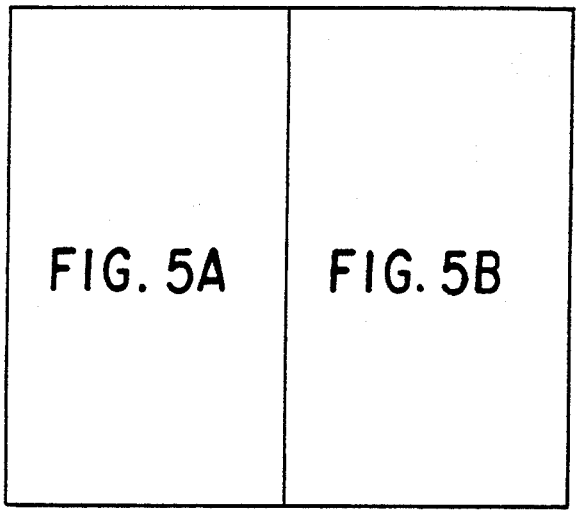
Figure 5B:
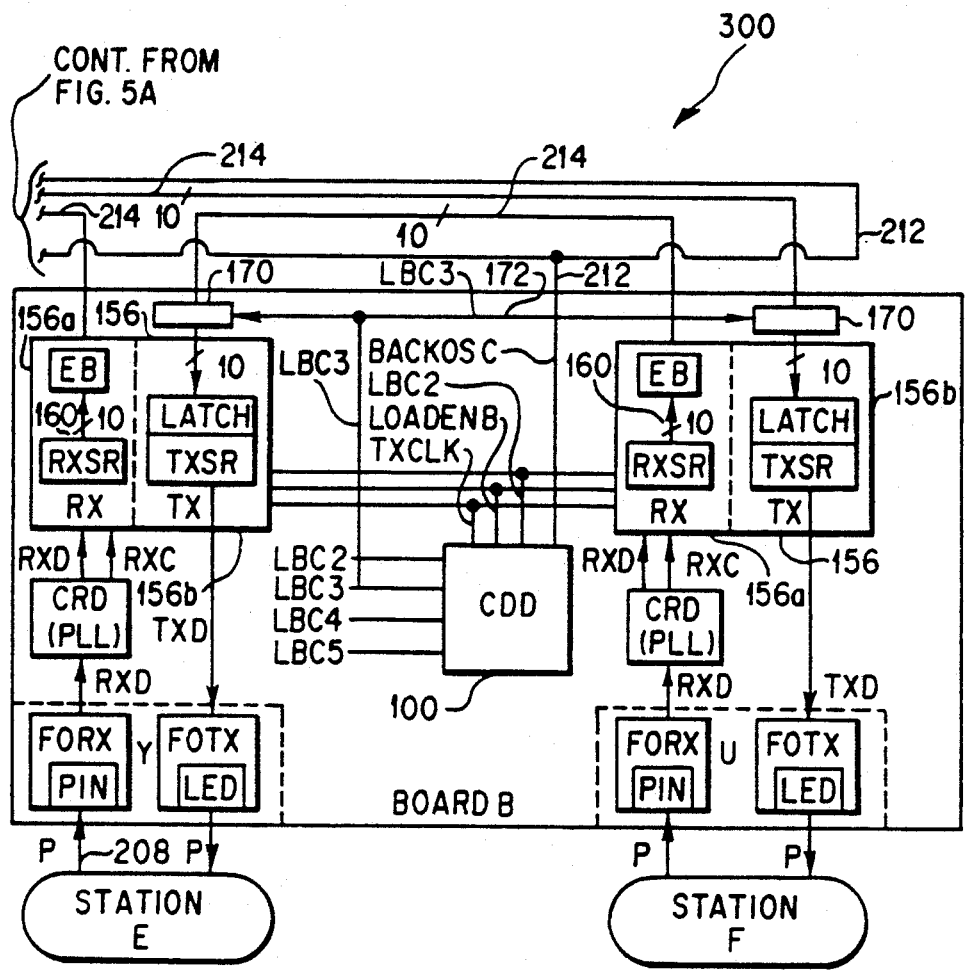
Figure 4:
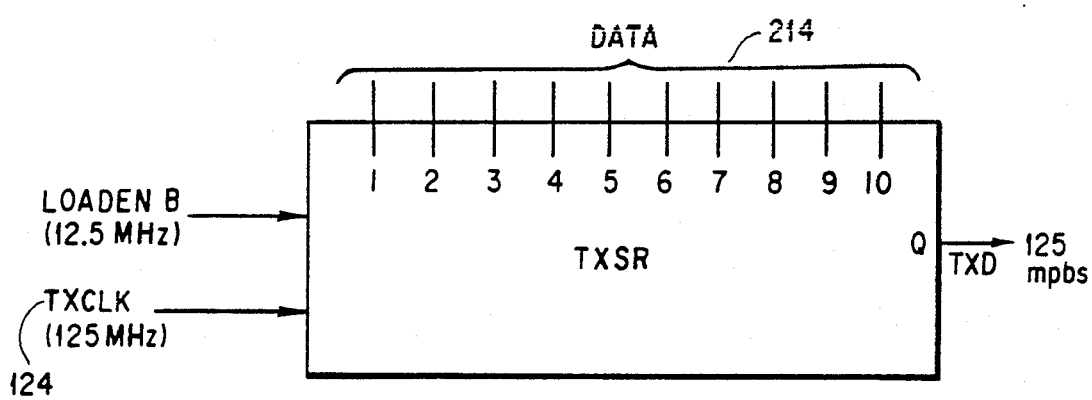
FIG. 4 is a block diagram of a shift register which accepts byte wide data and shifts the data out serially.

The LOADENB signal is used to load the byte-wide data (214 in FIGS. 3 and 5), into a transmit shift register TXSR from the back plane and serial data is shifted out using the transmit clock signal TXCLK 124 (TXSR in FIGS. 3-5). The load enable signal LOADENB has about the same frequency as the low frequency reference clock signal 212. In the preferred embodiment, where the CDD 100 is used in a concentrator 200 in the FDDI system, a second local byte clock signal (LBC2 for example) is used as a strobe signal to latch the byte-wide data 214 out of the back plane before loading it into the transmit shift register TXSR (FIGS. 3-5). The LOADENB signal leads the selected local byte clock signal (LBC2) by about 8 to 24 ns. in the preferred embodiment. The signals selected as the load enable signal LOADENB and as the strobe signal (LBC2) are selected such that there is a phase separation of 1-3 phases between them. The LOADENB signal leads the strobe signal.

Referring to FIGS. 1 and 3, a small concentrator 200 employing a CDD 100 on each back plane board Board A, Board N, Board B is illustrated. One board is designated as the master back plane board Board A and the other boards Boards N, B are designated as slave boards. A concentrator permits serial data to be received from stations A, B, N, C, D, E and F distributed across the back plane boards from board to board in parallel. In the preferred embodiment ten bits of data 214 are distributed across the back plane in parallel, where the "back plane" refers to the distribution of data from one back plane board to one, or a plurality of back plane boards in the concentrator 200.

As previously discussed, in a small concentrator 200, the number of boards Boards A, B, N at the back plane is such that the time that it takes (flight time) for the parallel data 214 to be distributed sequentially to all of the boards connected in a ring configuration at the back plane is minimal (e.g. less than about 20 ns.) and therefore, does not need to be compensated for. In contrast, in a large concentrator 300 (FIG. 5), the number of slave back plane boards is such that the flight time between boards has to be compensated for. Otherwise, if the flight time is not compensated for when the data 214 is transmitted from board to board, it will not be in synchronization when the data 214 returns back to the board where it originated from (the master board 200).

The board designated as the master board Board A has a master oscillator 120 which provides the low frequency clock signal 212 (clock signal 212) to all of the slave boards Board N, Board B. In this manner only one of the back plane boards (i.e., the master board) needs to have a master low frequency clock 120.

The CDD 100 on each of the back plane boards Board A, Board N, Board B receives the low frequency clock signal 212 generated by the master oscillator 120. (As previously discussed, when the CDD 100 is used in a concentrator 200, 300 (FIGS. 3, 5), the BACKOSC 120a signal, is selected. If the CDD 100 is being used in a single station (i.e., not in a concentrator) then the MSTROSC signal 120b is selected).

In the preferred embodiment, the stations Stations A, B, N, and the concentrator 200 are connected together via two counter rotating rings a primary ring (P) and a secondary ring (S) by means of a medium such as fiber, coax, etc. Together the primary ring (P) and the secondary ring (S) form a trunk ring, (or counter rotating ring). The stations Stations A, B, N coupled to the master board Board A are connected via the trunk ring. The trunk ring is connected to the master back plane board Board A via serial data ports T and C. In the illustrated embodiment there are three user stations Stations A, B, N connected to the master board Board A, however, any number of user stations may be connection. The user station, for example, Station A sends primary serial data 208 (referred to as "serial data") to the back plane master board Board A on a primary ring (P). Each user station coupled to the master board Board A also sends a data signal 208S to the master board Board A over the secondary ring (S) (which is connected to the master board Board A by the medium), for redundancy and fault isolation.

For example, Stations A is an upstream station from the concentrator 200. As will be discussed below, the serial data 208 from Station A, for example, is deserialized (i.e., converted into parallel data) on the master board Board A and the deserialized data 214 is passed through the back plane to the slave boards Board B and Board N which have serial ports U, Y, W, B connecting the slave stations (Stations F, E, D, C) logically to the Primary trunk ring (P). Specifically, in the illustrated embodiment, the deserialized data 214 from Station A passes to the slave stations in the following order: from Station A to the master board Board A, and then to slave board Board B; the data is transmitted from slave board Board B to Station F, then to Station E, then the data is transmitted in parallel to slave board Board N, where the data is transmitted in series to Station D and then to Station C.

The last back plane board Board N, returns the deserialized data 214 back to the master board Board A where the data 214 is serialized and passed back onto the primary ring to the downstream station Station B. From Station B, the serial data 208 is sent to Station N and then back to the upstream station where the data originated from Station A.

The slave stations Stations C-F, are also coupled to the slave board Boards N and Board B via medium such as fiber, but they are not physically part of the trunk ring. Rather they are logically connected to the primary ring (i.e., they are connected by the primary data 208).

As illustrated, two slave stations Stations C & D and Stations E & F connected to each of the slave boards Boards N, B respectively. The number of slave stations which may be connected to a slave board is not limited to two; rather, the physical size of the back plane board determines the number of slave stations which may be coupled to it. For example, an IBM AT board can support only one station but a VME board may support up to four slave stations because the VME board is physically larger than the AT board. As previously discussed, the number of slave boards Boards N, B in the small concentrator 200 is limited by the total flight time delay of the clock signal 212 and the data signal 214 when they are distributed at the back plane.

Each user station (Stations A-F, N) is coupled to the boards Boards A, B, N by a fiber optic receiver (FORX) having a PIN diode and a fiber optic transmitter (FOTX). The serial data 208 from a user station (Station A) is received by the fiber optic receiver FORX and the received data RXD is input into a clock recovery device (CRD), having a built in PLL, which generates a 125 MHz clock signal RXC. The RXC clock signal is in phase with the received data RXD such that the falling edge of the RXC signal locks in phase with any edge of the RXD signal. The received serial data, RXD, is input into a receive shift register (RXSR) which, in the FDDI scheme, may be part of the FDDI standard physical layer. The physical layer encodes, decodes, serializes and deserializes data and conforms to ANSI standard. In the preferred embodiment, the physical layer is part of a physical layer controller chip (PLAYER) 156.

Similar components on each board are designated with the same reference numerals/names. In addition, redundant components dedicated to the secondary data ring(S) are designated with the same reference numerals/names but ending in an "S". In order to accommodate for the secondary ring S, the master board Board A and Stations A, B, and N have two Player chips 156, two fiber optic receivers 218, 218S, and two fiber optic transmitters 220, 220S. The components dedicated to the redundant data 208S from the secondary ring operate it the same manner as the components dedicated to the primary ring P and, therefore will not be discussed.

The Player chip 156 is divided into a two sections: a receiver 156a (RX) and a transmitter 156b (TX). The receiver 156a has the receive shift register RXSR which receives the serial data RXD from the CRD, deserializes it, and generates a received byte clock RBC, (a 12.5 MHZ signal in the preferred embodiment), and converts the serial data RXD into parallel n-bit wide data 160, where the n-bit data is defined as byte wide data. In the FDDI scheme, the parallel n-bit wide data 160 out of the receive shift register RXSR is 10 bits wide and the 10-bit wide data 160 is input into an elasticity buffer EB. The 10-bit byte-wide data 214 is comprised of 8 bits of data, 1 control bit, and 1 parity bit.

The elasticity buffer EB uses two clock signals: the received byte clock signal RBC and one of the byte clock signal LBC1-LBC5 generated by the local CDD 100 on the board (Board A for example) receiving the incoming data 208. The received byte clock signal RBC is used to write the incoming parallel data signal 160 into the elasticity buffer EB while a local byte clock signal, (LBC2 for example), is used to read the byte wide data signal 160 out of the elasticity buffer EB. By using one of the local clock signals LBC2 to clock out the byte wide data 160 temporarily stored in the elasticity buffer EB, the parallel data 160 is resynchronized to a known local frequency.

The byte wide data signal 160 stored in the elasticity buffer EB is synchronized to the selected local frequency clock signal LBC2 by using the selected local frequency clock signal LBC2, to read out the data signal 160 out of the elasticity buffer EB in parallel 214. Hence, the elasticity buffer EB synchronizes and deskews the byte wide data signal 160 received from any upstream station since the elasticity buffers EB on each board Board A, N, B in the concentrator 200 use the same master clock signal 212 in their CDD 100 to generate local byte clock signals LBC1-LBC5 having about the same phase and frequency. In the preferred embodiment the local frequency clock signals are 12.5 MHz signals.

The data signal read out of the elasticity buffer EB is referred to as the transmit data signal 214 since it is transmitted at the back across the back plane data bus to the next back plane board (Board B for example) in the concentrator 200. For example, if the synchronized transmit data signal 214 is being transmitted from the master board Board A to the next board Board B, the data signal 214 is received by the transmitter 156b on the slave board Board B. Hence, the serial data 208 received from Station A which coupled to Board A, is transmitted as byte-wide data 214 at the back plane. Since 10 bits of data 214 are transmitted simultaneously in parallel, only 12.5 MHz of bandwidth is needed for transmission. Hence, only a 12.5 MHz frequency clock signal is needed to transmit the parallel data 214 between the back plane boards Boards A, N, B.

The phase locked loop 102 (FIG. 2) in each CDD 100 on each back plane board receives the low frequency master clock signal 212 (BACKOSC) from the master board Board A and uses it 212 to generate a high frequency transmit clock signal TXCLK. The transmit clock signal TXCLK is used locally (i.e., on the board Board A, N, B where it is generated) to convert the parallel data signal 214 is received back into serial format so that the data signal 214 can be distributed across the fiber medium to the next slave station (Stations C, D, E, F for example).

Referring also to FIGS. 4 and 6, the 10 bits of the parallel transmit data signal 214 are received by an internal latch(LATCH) which is part of the transmitter 156b and the 10 bits of parallel data 214 are clocked into the latch (LATCH) by a local byte clock signal having about the same phase as the local byte clock signal used on the upstream board to read the byte wide data signal 160 out of the elasticity buffer EB. Hence, the LBC2 clock signal, generated on the downstream board (Board B) receiving the parallel data 214 is used to clock the data signal 214 into the latch LATCH in parallel. The parallel data signal 214 is simultaneously loaded into the transmit shift register TXSR on the rising edge of the load enable signal, LOADENB. The LOADENB signal is generated on the board receiving the transmitted data signal 214 (Board B, for example) and it is used to control when the transmit data signal 214 is to be loaded into the transmit shift register TXSR. As previously discussed, the phase of the local byte clock signal selected to strobe out the data from the elasticity buffer EB on the receiver and to load the shift register TXSR with the data temporarily stored on the transmitters internal latch (LATCH) have about the same phase and frequency. Yet, there is a phase difference of 1-3 cycles between them and the local byte clock signal selected as the LOADENB signal.

As previously discussed, the LOADENB signal is a 12.5 MHz clock signal which is generated by the local CDD 100 on the board receiving the transmit data signal 214 (Board B for example). The local CDD 100 also generated for local use the high frequency transmit clock signal TXCLK. In the preferred embodiment the transmit clock signal TXCLK is a 125 MHz signal. The transmit clock signal TXCLK is input into transmit shift register TXSR along with the LOADENB signal. Since, the LOADENB signal is a 12.5 MHz signal, it is ten times slower than the 125 MHz transmit clock signal TXCLK. Thus the transmit clock signal TXCLK pulses ten times during the time period (one clock cycle) in which the load enable signal LOADENB pulses once. The locally generated high frequency clock signal TXCLK is used to read out in series, at 125 Mbps, the transmit data signal 214 stored in the transmit shift register TXSR. All ten bits of data 214 are read out of the transmit shift register TXSR before the next rising edge of the 12.5 MHz LOADENB pulse is received by the shift register TXSR. The serial data clocked out of the shift register TXSR is denoted as the "TXD signal" by the falling edge of TXCLK.

By using a high frequency clock signal TXCLK to clock out the parallel data signal 214 stored in the transmit shift register TXSR, in one low frequency clock cycle, the parallel data signal 214 is read out in series thereby converting the parallel data signal 214 transmitted across the back plane data bus back into serial data format. The serial signal TXD is received by the fiber optic transmitter FOTX, having an LED which converts electrical signal to optical pulses for transmission to the slave station Station F coupled to Board B.

While the RXC clock signal and the transmit clock TXCLK signal are both high frequency 125 MHz clock signals, the two signals may differ by ±50 ppm since each CRD on each board generates its own RXC signal from the serial data signal 208 transmitted from a remote station. However, since each CDD 100 on each board Boards A, N, B receives the same low frequency clock signal 212 from the master oscillator 120 on the master board Board A, and each board Boards A, N, B in the concentrator uses it 212 to generate a high frequency transmit clock signal TXCLK, the TXCLK signal on each board have approximately the same frequency.

Referring to FIGS. 7a-7c and FIG. 2, timing diagrams corresponding to the small concentrator 200 of FIG. 3, for distributing parallel data at the back plane, are illustrated. As previously discussed, the CDDs 100 on each of the back plane boards Boards A, N, B are referenced to the low frequency clock signal 212 generated by the master oscillator 120 on the master board Board A.

Figure 7A:
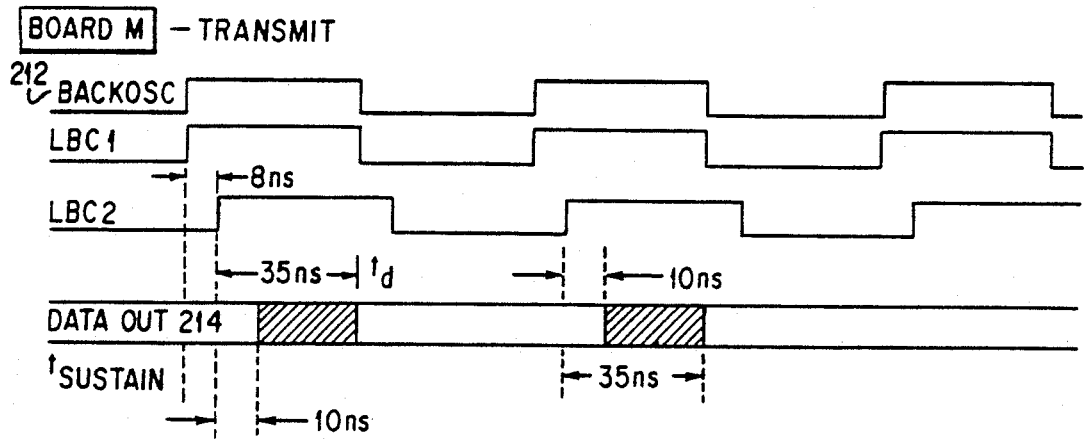
FIGS. 7a-7c are timing diagrams corresponding to the small concentrator scheme of FIG. 3.

Referring in particular to FIGS. 2 and 7a, a transmit timing diagram for the master board Board A output is illustrated. The LBC1 signal is selected as the signal which connects to the Feedback-In signal 123 to close the phase lock loop 102 and it has about the same phase and frequency as the clock signal 212. The LBC2 clock signal lags the LBC1 signal by 8 ns. As preciously discussed, in the preferred embodiment the LBC2 clock signal is the local byte clock signal selected to strobe the parallel data 160 out of the elasticity buffer EB. $t_d$ is the time it takes for the parallel data from the previews clock cycle (DATA OUT) 214 to become valid when it is strobed out of the elasticity buffer EB by the leading edge of the LBC2 clock signal. In the preferred embodiment $t_d = 35$ ns. $t_{sustain}$ is the earliest time for the parallel data signal 214 from the previous clock cycle to change after the leading edge of the LBC2 signal. As illustrated, $t_{sustain} = 10$ ns.

Figure 7B:
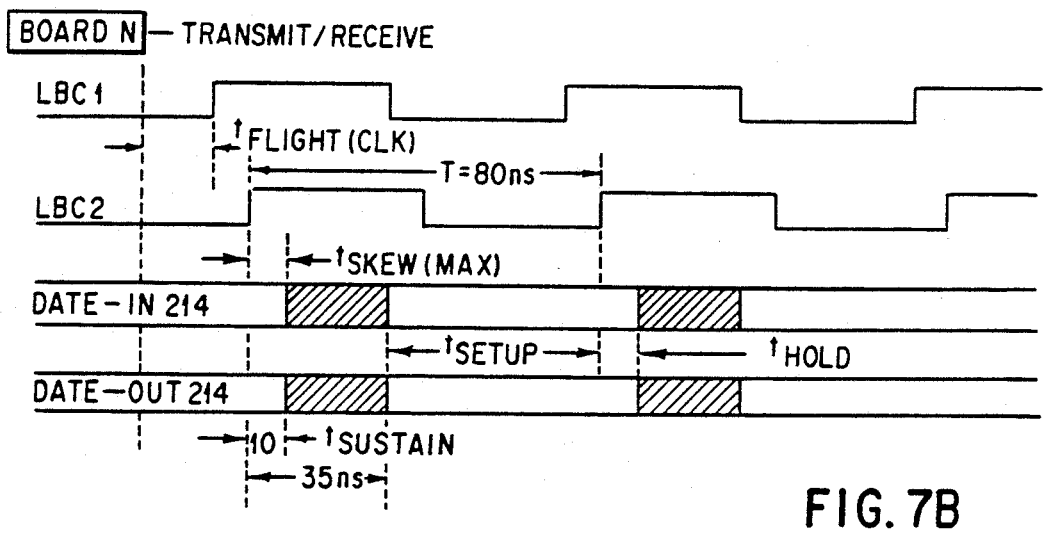

Referring to FIG. 7b, a timing diagram for receiving data at (DATA IN) and transmitting data from (DATA OUT) the last board Board N in the small concentrator 200 is illustrated. LBC1 is the local byte clock signal generated by the CDD on Board N using the BACKOSC clock signal 212. $t_{flight\ (CLK)}$ is the maximum time required for the clock signal 212 to travel from the master board Board A to the last board Board N. In the preferred embodiment, $t_{flight\ (CLK)} = 20$ ns. which means that it takes 20 ns. for the clock signal 212 to travel from the master board Board A to the last board Board N in the concentrator 200. Hence, the LBC1 signal that is generated on the last board Board N using the clock signal 212 lags the LBC1 signal generated on the master board Board A (FIG. 7a) by 20 ns. The LBC2 signal generated on Board N lags the LBC1 signal by 8 ns.

$t_{skew}$ is the time difference between the time that it takes for the clock signal 212 travel from the board (Board B) transmitting the parallel data signal (DATA IN) 214 to the receiving board (Board N) and the time that it takes for the parallel data 214 (DATA IN) to travel from the transmit board (Board B) to the receiving board (Board N).

$t_{setup}$ is the time period during which the received data (DATA IN) 214 remains valid before the data is sampled. The data is defined to be valid when the leading edge of the LBC2 clock signal occurs and the data is read into the latch on transmitter 156b. The minimum set up time required is 5 ns. During the set up time the load enable signal LOADENB enables the transmit shift register TXSR and the data from the previous clock cycle that is stored in the latch is read out in parallel into the transmit shift register TXSR.

$t_{hold}$ is the time during which the parallel data 214 (DATA IN) remains valid and unchanged after the sampling leading edge of the LBC2 clock signal. The minimum hold time required is 0 ns.

If the clock signal 212 flight time from the previous board (Board B) is less than the data signal's (DATA IN) 214 flight time from previous board (Board N), $t_{skew}$ increases $t_{hold}$ and decreases $t_{setup}$. Conversely, if the clock signal 212 arrives after the data signal 214 (DATA IN) is received, $t_{hold}$ decreases and $t_{setup\ pl\ increases}$. Having more $t_{setup}$ time than $t_{hold}$ time is more desirable because more time is available to tolerate longer data flight time than clock signal flight time.

The maximum $t_{skew} = t_{sustain} = t_{hold}$. For the slave boards Boards N, B, $t_{hold}$ and $t_{setup}$ are determined as follows:

$$t_{hold} = t_{sustain} - t_{skew} \tag{1}$$

$$t_{setup} = T - t_d - t_{skew} \tag{2}$$

where T = the time period between the rising edges of the local byte clock signal selected as the strobe signal (LBC2 in the preferred embodiment).

In the preferred embodiment, for $t_{sustain} = 10$ ns.:

T = 80 ns.

$t_d = 35$ ns.

$t_{holdmin} = 0$ ns.

$t_{setupmin} = 5$ ns.

for equation 1, $t_{skew} = 10$ ns. and for equation 2, $t_{skew} = 40$ ns. Hence, to accommodate for both conditions, the maximum $t_{skew}$ is about 10 ns. (i.e., the data signal 214 cannot lead the clock signal 212 by more than about 10 ns., for a $t_d = 35$ ns and $t_{setupmin} = 5$ ns.) Thus, the skew time is the primary factor in determining the maximum number of back plane boards in the small concentrator 200.

Figure 7C:
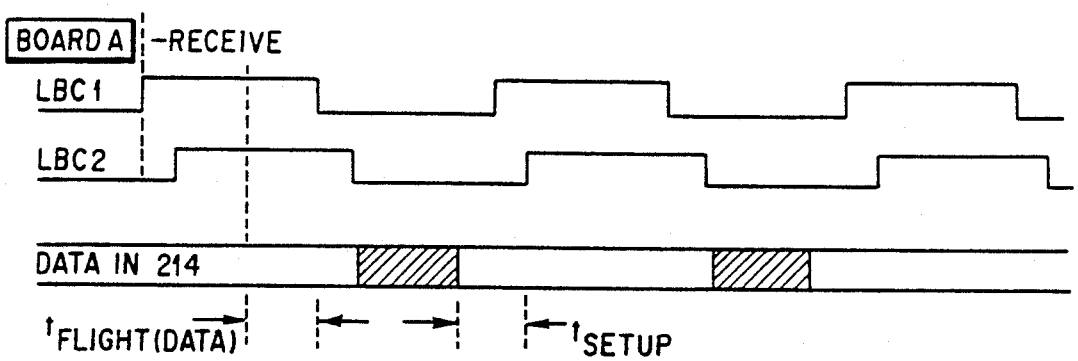

FIG. 7c is similar to FIGS. 7a and 7b but it is a timing diagram for the data signal received (DATA IN) by the master board Board A from the last slave board Board N. $t_{flight\ (DATA)}$ is the time it takes for the data signal 214 (DATA OUT) to travel from the last board Board N in the concentrator 200 back to the board where the data originated from, which in the illustrated embodiment is the master board Board A.

$$t_{hold} = T - t_{setup} \tag{3}$$

The setup time, $t_{setup}$, is the time that the input data from the previous clock cycle remains valid and unchanged prior to the leading edge of the next LBC2 clock signal. In particular:

$$t_{setup} = T - t_d - t_{flight(clk)} - t_{flight(data)} \tag{4}$$

For $t_{holdmin} = 0$ ns., $t_{setupmin} = 5$ ns., T = 80 ns., $t_d = 35$ ns. and assuming $t_{flight(clk)} = t_{flight(data)} = t_{flight}$, solving for Equation 4 results in:

$$5 = 80 - 35 - 2\ t_{flight}$$

$t_{flight} \approx 20$ ns.

Thus, the maximum flight time for the data (to travel across the back plane) is about 20 ns. Hence, the size of the concentrator (i.e., the number of back plane boards) is limited to the maximum number of boards over which the clock signal 212 and the data signal 214 can travel in less than about 20 ns.

Referring to FIGS. 5 and 8a-8d, the CDD 100 may be used in a large concentrator 300 wherein, due to the multiplicity of back plane boards (Boards A-Board NN) in the system 300, the data flight time (or skew) between the boards is more than about 20 ns (with the small concentrator 200, the number of boards at the back plane is such that the total flight time between the boards is less than 20 ns.). Similar elements on the back plane boards in the large concentrator 300 are referenced with the same names/numerals as in the small concentrator 200 of FIG. 3. The CDD 100 employed in a large concentrator 300 and in a small concentrator 200 are the same.

In order to alleviate the data flight delay problem in the large concentrator 300, each board Board A— Board NN in the large concentrator 300 has an edge triggered latch element 170 which latches in the byte wide data signal 214. In the large concentrator 300, the data signal 214 transmitted from an upstream board is input to the latch 170 on the down stream back plane board. In the preferred embodiment, the latch element 170 is a negative edge triggered latch. In the previous example, the master board Board A sent a parallel data signal 214 to Board B. (Hence, the upstream board is Board A and the downstream board is Board B.)

The data signal 214 temporarily stored in the latch 170 is strobed out using one of the locally generated phase separated local byte clock signals LBC2-LBC5 as a strobe signal 172 to strobe out the received parallel data signal 214 from the latch element 170. The particular local byte clock signal selected depends upon the time delay associated with transmitting the parallel data signal 214 from the upstream back plane board to the particular downstream board. The strobe signal 172 that is selected to strobe the data signal 214 into the latch 170 is one of the local byte clock signals LBC2-LBC5 (generated on the receive board) which is closest to the center of the data pattern yet provide the latch 170 with sufficient setup and hold times and the internal transmitter latch (LATCH) with sufficient setup and hold time. In the illustrated embodiment the LBC3 local frequency clock signal is selected as the latch strobe signal 172.

The strobe signal 172 is selected to lag behind the LBC1 signal by a sufficient amount, to account for the data skew time $t_{skew(data)}$ to ensure that the entire data signal 214 is latched into the latch 170 thereby eliminating the chance that the skew time between the boards will cause non-data to be clocked into the transmit shift register TXSR instead of the data signal 214. For example, if the clock and data skew is 7 ns. from the upstream board to the next back plane board, then the LBC3 signal would be selected as the strobe signal 172 because it is phase delayed 8 ns. behind the LBC2 signal. In the preferred embodiment, the LBC3 signal, which lags the LBC2 signal by 8 ns., is the locally generated strobe signal 172.

The latch element 170 on the receiving downstream board Board B latches in the data signal 214 on the negative edge of the strobe signal 172 (LBC3) allowing sufficient setup and hold time, thereby eliminating the flight time $t_{flight(DATA)}$ and skew time $t_{skew}$ requirements as discussed with the small concentrator 200.

In the large concentrator 300, the primary limitation on the size of the concentrator (i.e., the number of back plane boards in the system) is the driving capability of the signal 212. In the preferred embodiment, a TTL clock driver can drive 8 loads (8 boards). To extend beyond eight boards, the clock signal 212 must be repeated on the eighth (or last) board via another TTL Buffer on the eighth board in order to drive another eight boards.

Figure 8A:
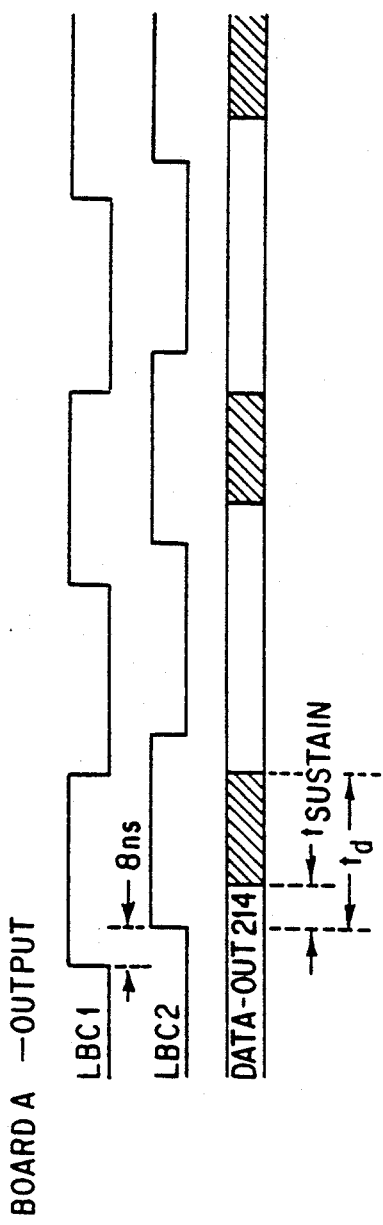
FIGS. 8a-8d are timing diagrams corresponding to the large concentrator scheme of FIG. 5.

FIG. 8a is a timing diagram similar to FIG. 7a, for transmitting a data signal 214 (DATA OUT) from the master board Board A to a downstream slave board, Board B. As with the small concentrator 200, the LBC1 signal is selected as the signal which connects to the Feedback-In signal to close the PLL 102 and therefore the LBC1 clock signal is the reference signal which the PLL 102 is attempting to lock to. The LBC2 signal lags 8 ns. behind the LBC1 signal. The LBC2 signal is selected as the signal used to strobe out the parallel byte wide data 160 from the elasticity buffer EB (DATA OUT). $t_{sustain}$ is the old data hold time (i.e. the amount of time from when the external clock signal is received by the receiver and when the receiver outputs the new data stored (DATA OUT). In the preferred embodiment, $t_{sustain}$ is 10 ns. $t_d$ is the time it takes for the parallel data signal 214 to become valid (i.e. the amount of time that it takes for the current data signal RXD to be strobed out of the EB). In the preferred embodiment, $t_d$ is about 35 ns.

Figure 8B:
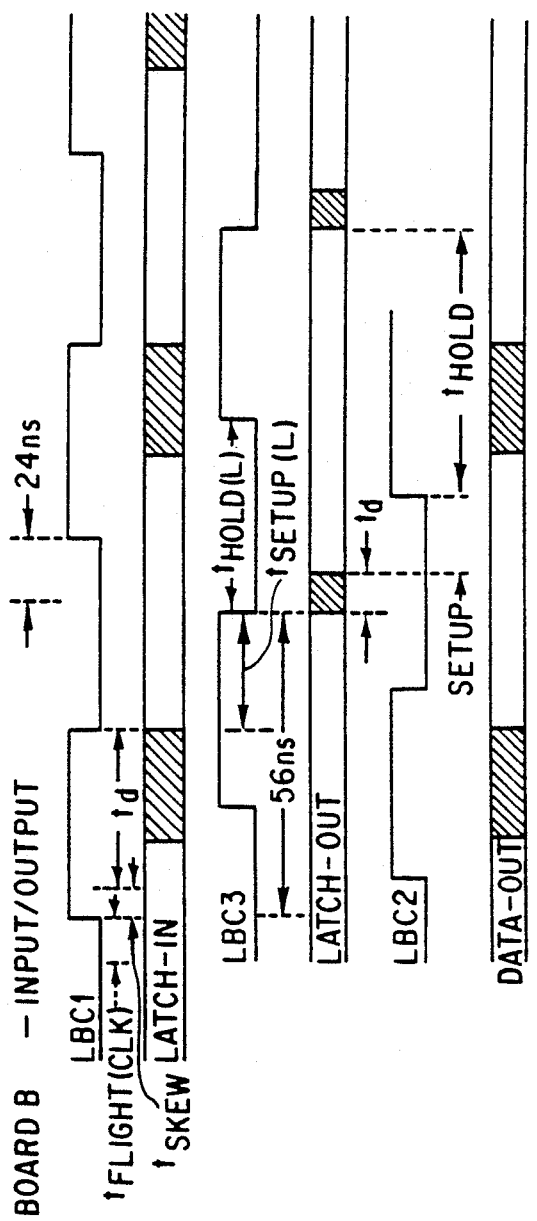

Referring to FIG. 8b, a timing diagram for receiving a parallel data signal 214 (DATA IN) from the upstream board at a slave board (Board B—Board NN) at the back plane and transmitting the data signal 214 (DATA OUT) from the back plane slave board to another board is illustrated. When the external latch strobe signal (LBC3) 172 is in a logic low state the transmitted data signal 214 (LATCH IN) is latched into the latch element 170. On the rising edge of the LBC2 clock signal, the data signal 214 stored in the latch element 170 (LATCH OUT) is strobed into the internal latch in the transmitter 156b and then loaded into the transmit shift register TXSR when the TXSR is enabled by the load enable signal LOADENB.

The external latch element 170 set up time, $t_{setup(L)}$ is:

$$t_{setup(L)} = 56 \ ns. - t_{skew} - t_d \qquad (5)$$

where the leading edge of the LBC1 to falling edge of the external latch strobe signal LBC3 is 56 ns.

The latch hold time, $t_{hold(L)}$ is:

$$t_{hold(L)} = 24 \ ns. + t_{sustain} - t_{skew} \qquad (6)$$

where the falling edge of the external latch strobe signal LBC3 to the leading edge of LBC1 is 24 ns.

In the preferred embodiment, the required external latch set up time is about 5 ns., and the $t_d = 35$ ns. therefore, solving Equation 5:

$$t_{setup(L)} = 56 \ ns. - t_{skew} - 35 = 5 \ ns. \ \therefore t_{skew} \leq 16 \ ns.$$

In the preferred embodiment, the required latch hold time is 0 ns., and $t_{sustain}$ is 10 ns. Therefore solving for equation 6:

$$t_{hold(L)} = 24 \ ns. + 10 \ ns. - t_{skew} = 0 \ ns. \ \therefore t_{skew} \leq 34 \ ns.$$

Thus in the preferred embodiment, a $t_{skew}$ of about $\leq 16$ ns. is the design specification for the slave boards in the large concentration 300 in the preferred embodiment. Since the parallel data signal 214 and the clock signal 212 travel nearly the same distance between each back plane board, the skew between them, $t_{skew}$, is less than about 16 ns.

Figure 8C:
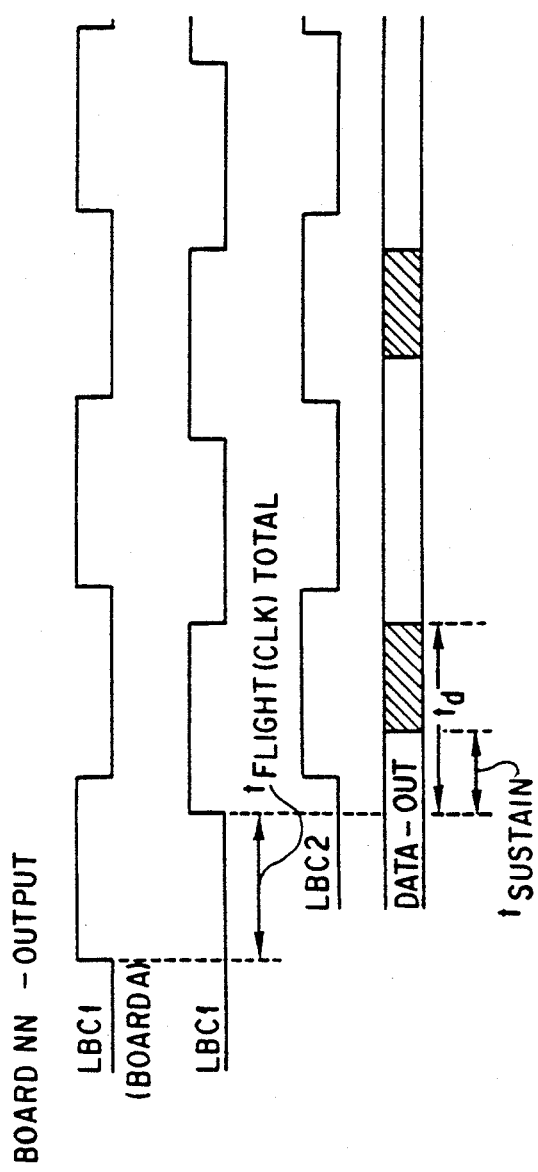

Referring to FIG. 8c, a timing diagram for the output from the last slave board Board NN is illustrated.

The input timing is same as in FIG. 8b. However the total flight time of the clock signal 212 is the difference between the phase of the LBC1 signal generated on Board A and that of the LBC1 signal generated on Board NN.

Figure 8D:
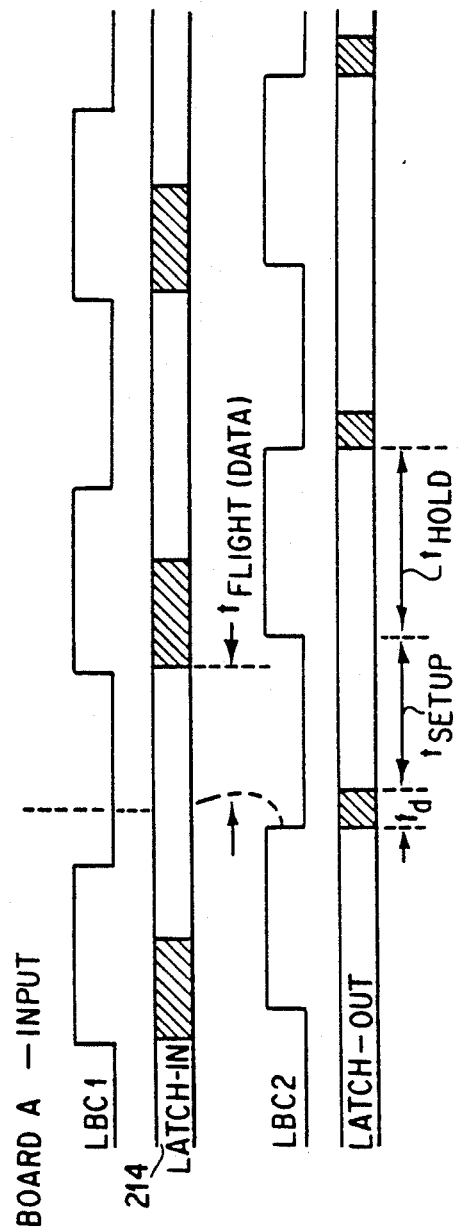

Referring to FIG. 8d, a timing diagram for transmitting data back to the master board (Board A) from the last slave board (Board NN) is illustrated, where the total round trip flight delay of the data signal and clock signal is:

$$t_{delay \ total} = t_{flight \ (CLK)} + t_{flight \ (DATA)}$$

The total flight delay time $t_{delay \ total}$ has to be absorbed by selecting the proper strobe signal for the latch element 170 while still meeting its setup and hold time requirements.

In order to cancel out the total flight delay time $t_{delay\ total}$, the external latch strobe signal 172 that is used to strobe in the data signal 214 (LATCH IN) to the transmitter 156b is a selectable signal. The strobe signal 172 is selectable so that the maximum latch setup time and the maximum latch hold time can be realized. In the illustrated embodiment, the falling edge of the LBC2 clock signal is used to latch in the data signal 214 from the last downstream board Board NN into the latch 170 on the board where the data originated from (Board A). The leading edge of the LBC2 signal in turn latches the data signal 214 (LATCH OUT) from the external latch 170 into the internal latch (LATCH) on the transmitter 156b. The internal latch's (LATCH) set up time is 40 ns.$-t_1$, where $t_1$ is the delay time of the external latch element 170, and $t_{hold}$ is 40 ns.$+t_1$. Since $t_1$ is about 10 ns., the $t_{setup}$ for the internal latch (LATCH) is 30 ns. and $t_{hold}$ is 50 ns.

In this manner, only one crystal byte clock 120 is needed in a concentrator application 200, 300 since all of the back plane boards Boards A-NN are synchronized to one master clock 120. Since all of the boards Boards A-NN are frequency and phase synchronized to one master clock 120, byte-wide data 214 may be distributed in parallel across the back plane data bus in synchronization. The data is then converted for serial transmission to stations A-F in the concentrator network.

Having thus described the invention, it is recognized that those skilled in the art many make various modifications or additions to the preferred embodiment chosen to illustrate the invention without departing from the spirit and scope of the present contribution to the art. Accordingly, it is to be understood that the prosecution sought and to be afforded hereby should be deemed to extend to the subject matter claimed and all equivalents thereof within the scope of the invention.

What is claimed is:

1. A system for sequentially distributing multiple bits of data in parallel to a plurality of receivers comprising:
    master clock means for generating a master clock signal having a first frequency;
    means for transmitting the master clock signal to at least first and second receivers;
    means at the first and second receivers for generating a second clock signal having a second frequency using the master clock signal transmitted to the first and second receivers;
    means at the first and the second receivers for generating a plurality of phase separated clock signals using the second clock signal wherein each of the phase separated clock signals has a frequency associated therewith;
    means for receiving multiple serial data bits at the first receiver and for storing the serial data bits in a first storage means;
    means for transferring the serial data bits stored in the first storage means in parallel to the second receiver;
    means for storing the transferred data bits in a second storage means; and
    means for reading out the data bits stored in the second storage means in series using the second clock signal generated on the second receiver.

2. The system of claim 1, wherein the means for transferring the received serial data stored in the first storage means uses a first preselected one of the plurality of phase separated clock signals generated on the first receiver to read the received serial data out of the first storage means in parallel.

3. The system of claim 2, wherein the means for storing the transferred parallel data in the second storage means includes a first means for latching in the transferred parallel data using a first preselected one of the plurality of phase separated clock signals generated on the second receiver.

4. The system of claim 3, wherein the first preselected one of the phase separated clock signal generated on the second receiver has about the same phase and frequency as the first preselected one of the phase separated clock signal generated on the first receiver.

5. The system of claim 1, wherein the frequency of the phase separated signals is about the same as the frequency of the master clock signal.

6. The system of claim 1, wherein the master clock signal is a low frequency signal.

7. The system of claim 1 wherein the first frequency of the master clock signal is about 12.5 MHz.

8. The system of claim 1, wherein the second clock signal is a high frequency clock signal.

9. The system of claim 1 wherein the frequency of the second clock signal is about 125 MHz.

10. The system of claim 1, wherein the means for generating a plurality of phase separated clock signals is a counter.

11. The system of claim 10 wherein the counter is a Johnson counter.

12. The system of claim 5 wherein the frequency of the master clock signal has a cycle time associated therewith and the frequency of the second clock signal is such that the means for reading out the data reads out the data stored in the second storage means in series within the cycle time of the master clock signal.

13. The system of claim 1, wherein the receivers are back plane boards.

14. The system of claim 1 wherein the means for generating the second clock signal includes a phase locked loop having means for comparing the phase of the master clock signal to a comparison signal generated by the phase locked loop, and generates an error signal indicative of the phase difference between the master clock signal and the comparison signal, and a voltage controlled oscillator responsive to the error signal for generating the second clock signal.

15. The system of claim 14, wherein the comparison signal has about same phase and frequency as the master clock signal.

16. The system of claim 1 wherein the plurality of receivers are connected sequentially in a ring configuration and the means for transmitting sequentially transmits the master clock signal from first receiver to the last receiver in the sequence and wherein the system has a total flight time associated therewith, wherein the total flight time is the sum of the total clock flight time and the total data flight time, wherein the total clock flight time is the time it takes to transfer the master clock signal from the first receiver to the last receiver in the sequence and the total data flight time is the time it takes to transfer data in parallel from the last receiver in the sequence back to the first receiver, wherein the number of receivers in the system which receive the master clock signal and the transferred parallel data is such that the total flight time exceeds a preselected value, and further comprises:
    first means for latching in the transferred parallel data received on the second receiver using a first preselected one of the plurality of phase separated clock signals generated on the second receiver and for strobing out the data from the first means for latching using the first preselected one of the plurality of phase separated clock signals generated on the second receiver for input to the means for storing.

17. The system of claim 16 wherein the first preselected one of the plurality of phase separated clock signals is selected to generate sufficient set up and hold times for the second means for latching and sufficient setup and hold times for the first means for latching.

18. The system of claim 1 wherein the plurality of receivers are sequentially arranged in a ring configuration and the means for transmitting sequentially transmits the master clock signal from the first of the receivers to the last of the receivers in the sequence, the system having a total flight time associated therewith, wherein the total flight time is the sum of the total clock flight time and the total data flight time, wherein the total clock flight time is the time it takes to transfer the master clock signal from the first receiver to the last receiver in the sequence and the total data flight time is the time it takes to transfer data in parallel from the last receiver in the sequence back to the first receiver, wherein the total flight time is such that the first receiver receives back the transmitted parallel data in synchronization.

19. The system of claim 18, wherein the total flight time is less than or equal to about 20 ns.

20. The system of claim 16, wherein the preselected value of the total flight time is about 20 ns.

21. The system of claim 16, wherein the preselected value of the total flight time is such that the when the parallel data is transferred back to the first receiver, it is in synchronization.

22. The system of claim 1, wherein the second storage means is enabled by the first preselected one of the plurality of phase separated clock signals generated on the second receiver such that the transferred parallel data is stored in the second storage means when the second storage means is enabled.

23. The system of claim 16, wherein the first preselected one of the phase separated clock signals is selected such that the first preselected phase separated clock signal is separated in phase from the second preselected phase separated clock signal by a preselected number of phases.

24. The system of claim 23, wherein the preselected number of phases is between about 1-3.

25. A method for sequentially distributing multiple bits of data to a plurality of receivers in a system, comprising the steps of:
generating a master clock signal having a first frequency and a phase associated therewith;
transmitting the master clock signal to at least first and second receivers;
generating a second clock signal having a second frequency at the first and the second receivers using the master clock signal transmitted to the first and second receivers;
generating a plurality of phase separated clock signals at the first and second receivers using the second clock signal wherein each of the phase separated clock signals has a frequency associated therewith at the first and second receivers using the second clock signal;
receiving multiple serial data bits at the first receiver and storing the serial data bits in a first storage means;
transferring the received serial data bits stored in the first storage means in parallel to the second receiver;
storing the transferred data bits in a second storage means; and
reading out the data bits stored in the second storage means in series using the second clock signal generated on the second receiver.

26. The method of claim 25, wherein the step of transferring the received serial data stored in the first storage means uses a first preselected one of the plurality of phase separated clock signals generated on the first receiver to read the received serial data out of the first storage means in parallel.

27. The method of claim 26, wherein the step of storing the transferred data in a second storage means includes the step of latching in the transferred parallel data into a first means for latching using a first one of the plurality of phase separated clock signals generated on the second receiver.

28. The method of claim 27, wherein the first preselected one of the phase separated clock signal generated on the second receiver has about the same phase and frequency as the first preselected one of the phase separated clock signal generated on the first receiver.

29. The method of claim 25, wherein the master clock signal is a low frequency signal.

30. The method of claim 25, wherein the frequency of the phase separated signals is about the same as the frequency of the master clock signal.

31. The method of claim 25 wherein the first frequency of the master clock signal is about 12.5 MHz.

32. The method of claim 25, wherein the second clock signal is a high frequency clock signal.

33. The method of claim 25 wherein the frequency of the second clock signal is about 125 MHz.

34. The method of claim 30, wherein the frequency of the master clock signal has a cycle time associated therewith and the frequency of the second clock signal is such that the step of reading out the data stored in the second storage means in series is accomplished within the cycle time of the master clock signal.

35. The method of claim 25 wherein the step of generating the second clock signal includes the steps of:
comparing the phase of the master clock signal to a comparison signal generated by a phase locked loop;
generating an error signal indicative of the phase difference between the master clock signal and the comparison signal; and
generating the second clock signal in response to the error signal.

36. The method of claim 35, wherein the comparison signal has about the same phase and frequency as the master clock signal.

37. The method of claim 25 wherein the plurality of receivers are connected in a ring configuration and having a total flight time associated with transferring the data in parallel, wherein the total flight time is the sum of the total clock flight time and the total data flight time, wherein the total clock flight time is the time it takes to sequentially transfer the master clock signal from the first receiver to the last one of the receivers and the total data flight time is the time it takes to transfer data in parallel from the last receiver in the sequence back to the first receiver, wherein the number of receivers in the system which receive the master clock signal and the transferred parallel data is such that the total flight time exceeds a preselected value, and further comprises the steps of:

latching in the transferred parallel data received on the second receiver into a second means for latching using a second preselected one of the plurality of phase separated clock signals generated on the second receiver and strobing out the data from the second means for latching using the first preselected one of the plurality of phase separated clock signals generated on the second receiver for input to the means for storing.

38. The method of claim 37, wherein the second preselected one of the plurality of phase separated clock signals is selected to generate sufficient set up and hold times for the second means for latching and sufficient setup and hold times for the first means for latching.

39. The method of claim 25 having a total flight time associated therewith, wherein the total flight time is the sum of the total clock flight time and the total data flight time, wherein the total clock flight time is the time it takes to sequentially transfer the master clock signal from the first receiver to the last one of the receivers and the total data flight time is the time it takes to transfer data in parallel from the last receiver in the sequence back to the first receiver, wherein the total data flight time is such that the first receiver receives the transmitted parallel data in synchronization.

40. The method of claim 39, wherein the total flight time is less than or equal to about 20 ns.

41. The method of claim 37, wherein the preselected value of the total flight time is about 20 ns.

42. The method of claim 37, wherein the preselected value of the total flight time is such that when the parallel data is transferred back to the first receiver, it is in synchronization.

43. The method of claim 25, wherein the receiver is a back plane board.

44. The method of claim 25, further comprising the step of enabling the second storage means by the first preselected one of the plurality of phase separated clock signals generated on the second receiver such that the transferred parallel data is stored in the second storage means when the second storage means is enabled.

45. The method of claim 37, wherein the first preselected one of the phase separated clock signals is selected such that the first preselected phase separated clock signal is separated in phase from the second preselected phase separated clock signal by a preselected number of phases.

46. The method of claim 45, wherein the preselected number of phases is between about 1-3.

47. A system for sequentially distributing multiple bits of data in parallel to a plurality of receivers connected in a ring configuration wherein the system has a total flight time associated therewith, wherein the total flight time is the sum of the total clock flight time and the total data flight time, wherein the total clock flight time is the time it takes to transfer the master clock signal from the first receiver to the last receiver in the sequence of the plurality of receivers and the total data flight time is the time it takes to transfer data in parallel from the last receiver in the sequence back to the first receiver, wherein the number of receivers in the system which receive a master clock signal and transferred parallel data is such that the total flight time exceeds a preselected value, comprising:

a master clock signal having a first frequency;

means for transmitting the master clock signal to at least a first and a second of the receivers;

means for generating a second clock signal having a second frequency on the first and the second receivers using the master clock signal transmitted to the first and the second receivers;

means at the first and the second receivers for generating a plurality of phase separated clock signals using the second frequency clock signal wherein each of the phase separated clock signals has a frequency associated therewith;

means for receiving the multiple bits of data at the first receiver in the sequence in series and for storing the serial data in a first storage means;

means for transferring the received serial data stored in the first storage means in parallel to the second receiver;

second means for latching in the transferred parallel data received receiver using a second preselected one of the plurality of phase separated clock signals generated on the second receiver;

means for strobing out the parallel data from the second means for latching in parallel using the first preselected one of the plurality of phase separated clock signals generated on the second receiver;

means for storing the parallel data strobed out of the second means for latching in a second storage means; and means for reading out the data stored in the second storage means in series using the second clock signal generated on the second receiver.

48. The system of claim 47, wherein the means for transferring the received serial data stored in the first storage means uses a first preselected one of the plurality of phase separated clock signals generated on the first receiver to read the received serial data out of the first storage means in parallel.

49. The system of claim 48, wherein the means for storing includes a first means for latching in the transferred parallel data using a first preselected one of the plurality of phase separated clock signals generated on the second receiver.

50. The system of claim 49, wherein the first preselected ones of the plurality of phase separated clock signals used to retrieve the received serial data has a phase and a frequency which are about the same as the phase and the frequency of the master clock signal.

51. The system of claim 47, wherein the first preselected one of the plurality of phase separated clock signals is selected to generate sufficient set up and hold times for the second means for latching and sufficient setup and hold times for the first means for latching.

52. The system of claim 47, wherein the frequency of the phase separated signals is about the same as the frequency of the master clock signal.

53. The system of claim 47, wherein the preselected value of the total flight time is about 20 ns.

54. The system of claim 47, wherein the preselected value of the total flight time is such that the when the parallel data is transferred back to the first receiver, it is in synchronization.

55. The system of claim 49, wherein the first preselected one of the phase separated clock signal generated on the second receiver has about the same phase and frequency as the first preselected one of the phase separated clock signal generated on the first receiver.

56. The system of claim 47, wherein the master clock signal is a low frequency signal.

57. The system of claim 47, wherein the first frequency is about 12.5 MHz.

58. The system of claim 47, wherein the receivers are back plane boards.

59. The system of claim 47, wherein the means for generating the second clock signal includes a phase locked loop having a means for comparing the phase of the master clock signal to a comparison signal generated by the phase locked loop, and generates an error signal indicative of the phase difference between the master clock signal and the comparison signal generated by the phase locked loop, and a voltage controlled oscillator responsive to the error signal for generating the second clock signal having the second frequency.

60. The system of claim 47, wherein the second frequency is about 125 MHz.

61. The system of claim 47, wherein the second clock signal is a high frequency clock signal.

62. The system of claim 47, wherein the means for generating a plurality of phase separated clock signals is a counter.

63. The system of claim 66, wherein the counter is a Johnson counter.

64. The system of claim 47, wherein the first frequency has a cycle time associated therewith and the frequency of the second clock signal is such that the means for reading out the data reads out the data stored in the second storage means in series within the first frequency cycle time.

65. The system of claim 47, wherein the second storage means is enabled by the first preselected one of the plurality of phase separated clock signals generated on the second receiver such that the transferred parallel data is stored in the second storage means when the second storage means is enabled.

66. The system of claim 65, wherein the first preselected one of the phase separated clock signals is selected such that the first preselected phase separated clock signal is separated in phase from the second preselected phase separated clock signal by a preselected number of phases.

67. The system of claim 62, wherein the preselected number of phases is between about 1-3.

68. The system of claim 59, wherein the comparison signal has about the same phase and frequency as the master clock signal.

* * * * *